March 6, 1951 R. O. BEACH 2,543,754
DETONATOR TESTING DEVICE
Filed Aug. 24, 1945 4 Sheets-Sheet 1
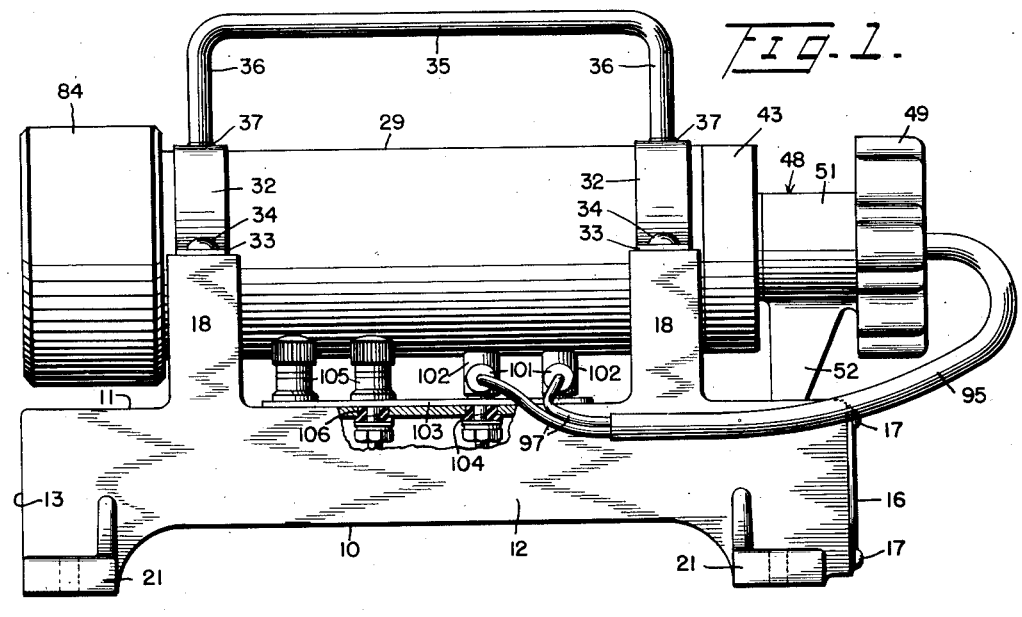
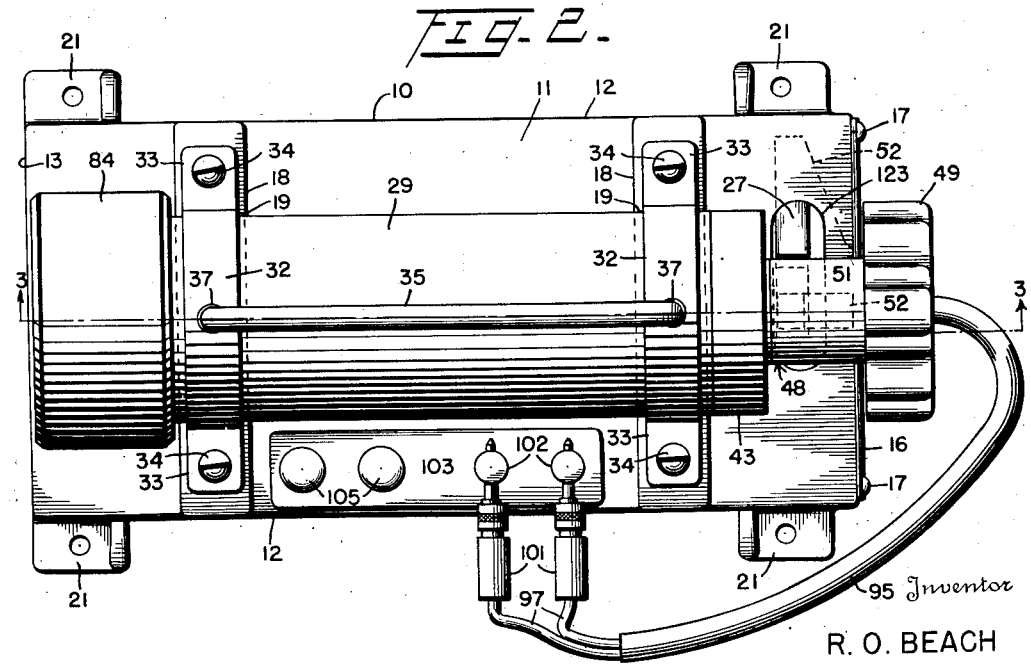
Inventor
R. O. BEACH
By Ralph L. Chappell
Attorney March 6, 1951 R. O. BEACH 2,543,754
DETONATOR TESTING DEVICE
Filed Aug. 24, 1945 4 Sheets-Sheet 2
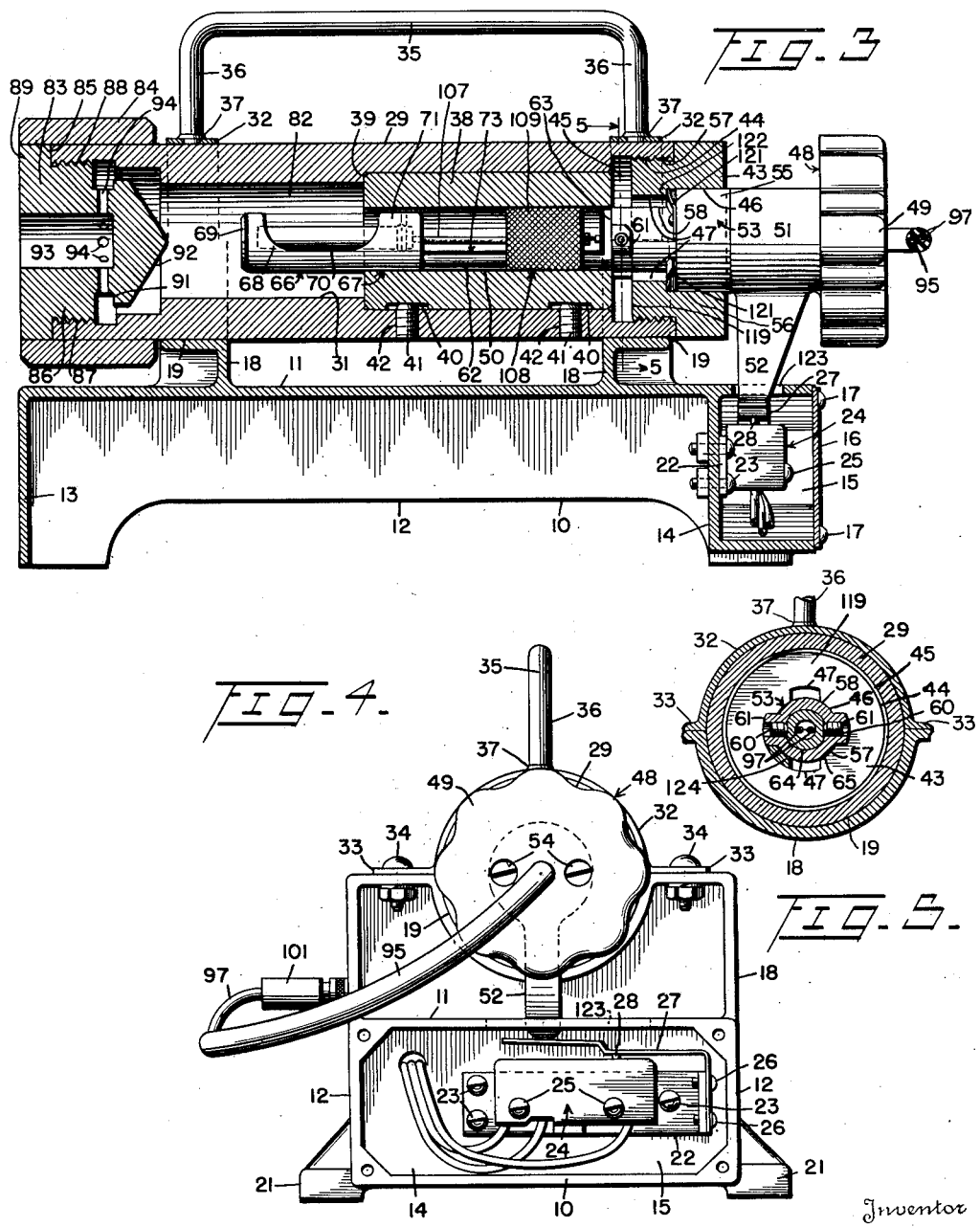
Inventor
R. O. BEACH
By Ralph L. Chappell
Attorney March 6, 1951  R. O. BEACH  2,543,754
DETONATOR TESTING DEVICE
Filed Aug. 24, 1945  4 Sheets-Sheet 3
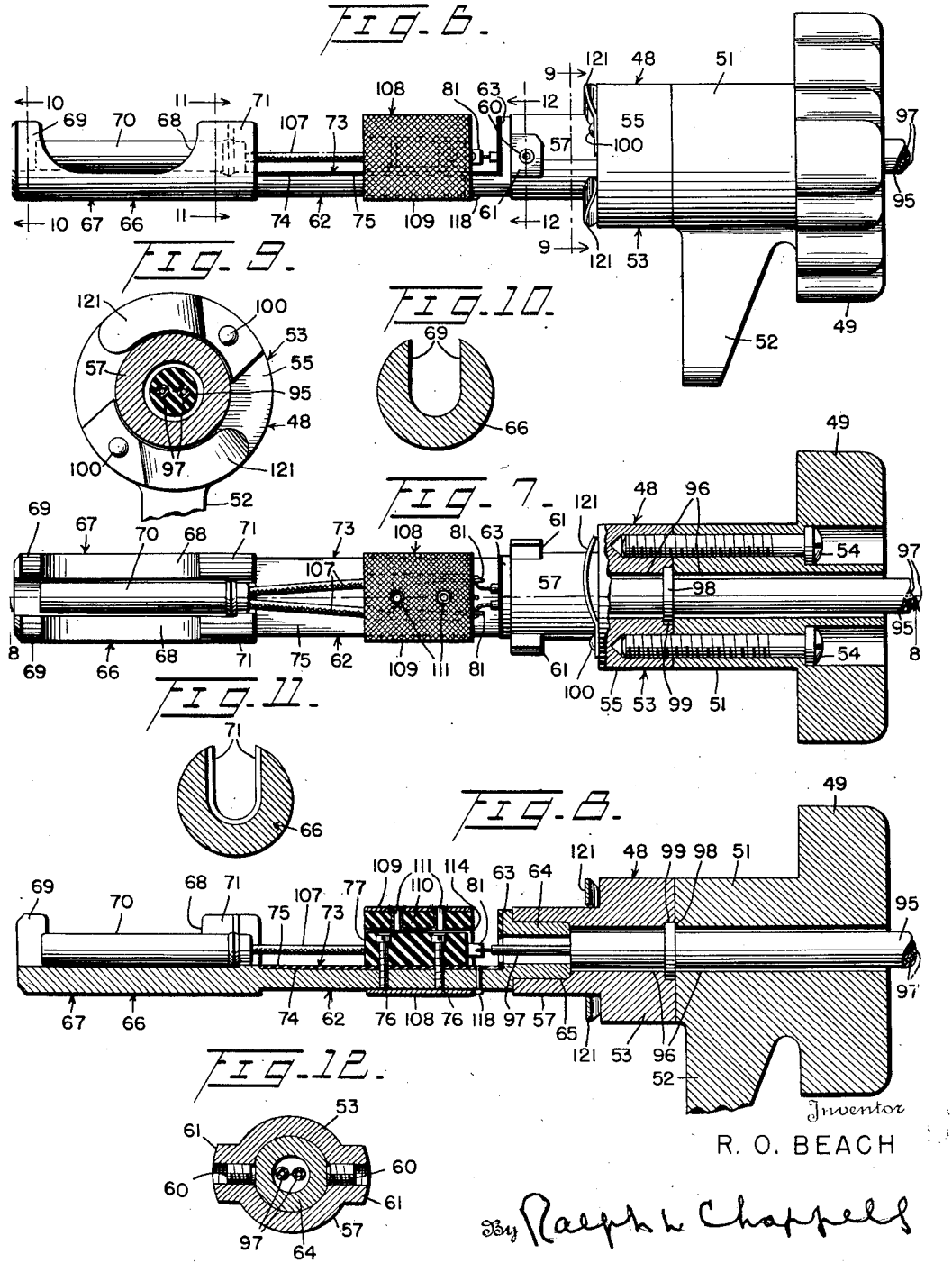
Inventor
R. O. BEACH
By Ralph W. Chappell
Attorney March 6, 1951  R. O. BEACH  2,543,754
DETONATOR TESTING DEVICE
Filed Aug. 24, 1945  4 Sheets-Sheet 4
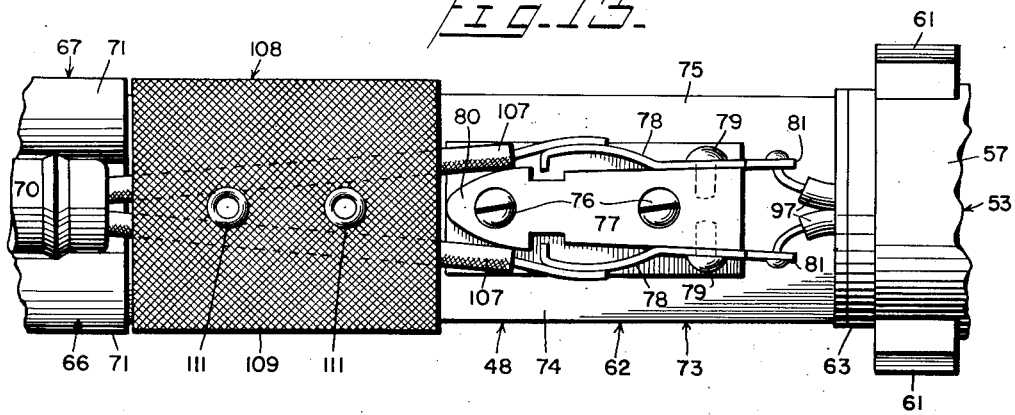
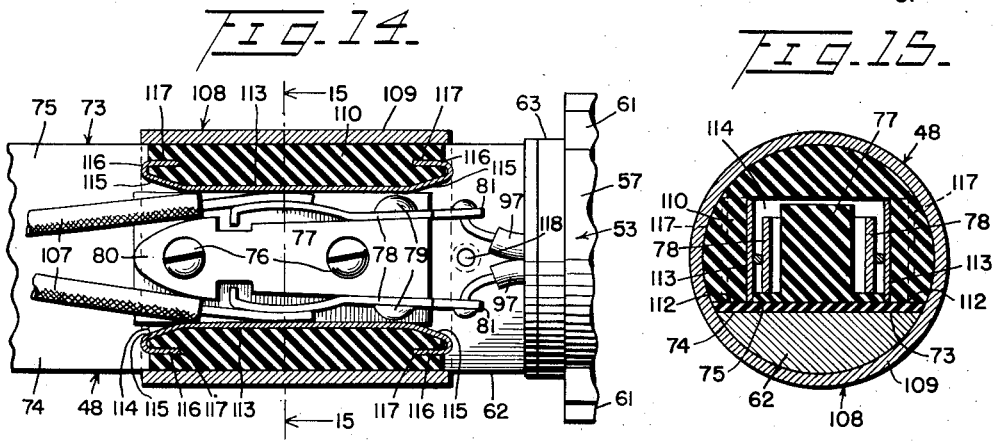
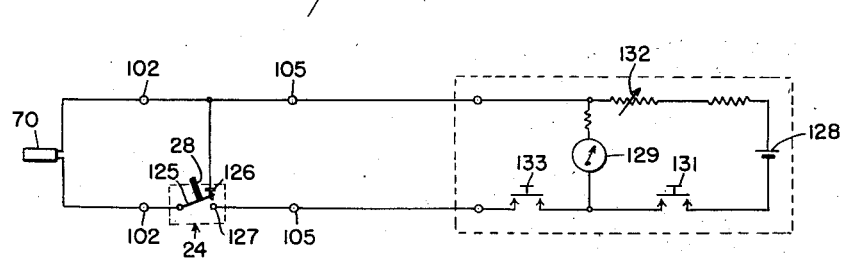
Inventor
R. O. BEACH
By Ralph L. Chappell
Attorney Patented Mar. 6, 1951

2,543,754

UNITED STATES PATENT OFFICE 2,543,754

DETONATOR TESTING DEVICE

Ronald O. Beach, Washington, D. C.

Application August 24, 1945, Serial No. 612,521

4 Claims. (Cl. 175—183)

(Granted under the act of March 3, 1883, as amended April 30, 1928; 370 O. G. 757)

The present invention relates to a testing device and more particularly to a device for testing electroresponsive detonators employed with ordnance devices and the like.

One of the objects of the invention is the provision of a new and improved device for testing an electroresponsive detonator and having means whereby the detonator is detachably supported within the device in testing position and the electrical connections thereto are quickly and easily established.

Another object of the invention is the provision of a new and improved testing device having means arranged thereon for short circuiting the detonator until the detonator has been inserted into the device and rotated a predetermined amount.

Another object of the invention is the provision of a testing unit including means whereby the detonator supporting device is maintained in testing position within the unit after being inserted therein.

Another object of the invention is the provision of a testing device having a detonator supporting element adapted to be inserted into the device and rotated to a test position in which means are provided for establishing an electrical circuit to the detonator as the detonator supporting element is rotated.

A further object of the invention is the provision of a testing device having an explosive chamber arranged therein and means for venting the explosive chamber in the event a detonator is fired during the testing operation.

A still further object is to provide a new and improved testing device which is reliable in operation and which possesses the qualities of durability and is also safe during testing operation of the detonator.

Still further objects, novel features and advantages of the invention will be apparent from the following description taken in connection with the accompanying drawings, wherein:

Fig. 1 is a side elevational view of a preferred form of detonator testing device constructed in accordance with the present invention;

Fig. 2 is a top plan view of the device of Fig. 1;

Fig. 3 is a central longitudinal sectional view of the device taken substantially on line 3—3 of Fig. 2;

Fig. 4 is a front elevational view of the testing device with the cover plate removed;

Fig. 5 is a detail sectional view taken on line 5—5 of Fig. 3;

Fig. 6 is an elevation view of the detonator holder and test unit;

Fig. 7 is a plan view of the device of Fig. 6 but partly broken away;

Fig. 8 is a view taken substantially on line 8—8 of Fig. 7;

Fig. 9 is a cross sectional view taken on line 9—9 of Fig. 6;

Fig. 10 is a cross sectional view taken on line 10—10 of Fig. 6;

Fig. 11 is a cross sectional view taken on line 11—11 of Fig. 6;

Fig. 12 is a cross sectional view taken on line 12—12 of Fig. 6;

Fig. 13 is an enlarged detail view of a portion of the test unit with a detonator arranged thereon and showing the detonator leads in engagement with the spring contact elements and the slider or clamping element retracted;

Fig. 14 is a view similar to Fig. 13 but showing the clamping element or slider in clamping position;

Fig. 15 is a cross sectional view taken on line 15—15 of Fig. 14; and

Fig. 16 illustrates in diagrammatical form an electrical circuit suitable for use with the testing device.

Referring to the drawings in detail for a more complete understanding of the invention, the testing device shown thereon comprises a base member generally indicated by the reference character 10 composed of any material suitable for the purpose such, for example, as aluminum or the like. The base member 10 includes an upper wall 11, a pair of side walls 12, and end wall 13 and an L-shaped wall 14 adjacent the front end thereof. The L-shaped wall is connected to the upper wall 11 and side walls 12 in such a manner so as to provide a chamber 15 adapted to be closed by a cover plate 16, the cover plate being secured to the base member in any suitable manner as by the screws 17. A pair of supports 18 are formed on the upper wall 11 of the base member 10 and extend a predetermined distance thereabove, each support being provided with an arcuate recess or depression 19, the purpose of which will be hereinafter more fully described. The base member is also provided with a plurality of laterally extending feet 21 formed thereon at each corner portion thereof thus providing means whereby the base member 10 may be secured to a bench, table or the like.

Arranged within the chamber 15 and secured to the L-shaped wall 14 is a bracket 22, the bracket being secured thereto in any suitable manner, preferably by screws indicated by the reference character 23. The bracket supports a microswitch generally indicated by the reference character 24, the switch being secured thereto by the screws 25. As clearly shown on Figs. 3 and 4 of the drawings the microswitch 24 is completely housed within the chamber 15 by the L-shaped wall 14, a portion of the upper wall 11, and the cover plate 16 thereby protecting the switch in such a manner as to prevent any damage thereto during handling or transportation. Supported by the bracket member 22 and secured thereto as by a pair of screws 26 is a resilient member 27 adapted to engage the usual contact actuating member 28 of the microswitch.

Seated within the pair of recesses or depressions 19 in the supports 18, is a relatively thick elongated tube or barrel 29 composed of any material suitable for the purpose such, for example as steel and having a centrally disposed bore 31 extending therethrough. The tube is maintained within the pair of recesses by a pair of arcuately shaped brackets 32 surrounding a portion of the barrel 29. Each bracket has a pair of lateral extensions 33 formed thereon adapted to be respectively secured to each of the supports by bolts or the like indicated by the reference character 34. A handle 35 is secured to the brackets 32 in any suitable manner preferably by welding each leg portion 36 thereof to each of the brackets as indicated by the reference character 37 thereby providing means for manually carrying the testing device from one place to another.

Arranged within one end of the bore 31, provided in the barrel 29 is a reinforcing sleeve and guide member 38 composed preferably of steel or the like, having one end thereof in abutting relation with respect to a shoulder 39 formed in the bore intermediate the end of the tube and being secured within the bore by a pair of screws 41 having threaded engagement with spaced threaded openings 42 provided in the barrel and extending into recesses 40 provided in the sleeve 38 thereby providing an arrangement whereby the tube is maintained in a fixed position within the barrel 29.

A cap or plug 43 composed of any material suitable for the purpose such, for example, as steel is threaded into an enlarged threaded portion 44 provided in one end of the bore 31 and extends a predetermined distance therein, thus providing a chamber 45 between the inner surface of the plug and the outer surface of the sleeve 38, the purpose of which will be hereinafter more fully described. The cap or plug 43 is provided with a centrally disposed opening 46 extending therethrough having a pair of diametrically opposite offset recesses 47 in communication therewith, the purpose of which will be more fully described as the description proceeds. As shown on Fig. 3 of the drawings, the opening 46 and the recesses 47 communicate with the chamber 45 which in turn communicates with a bore 50 extending through the sleeve 38 thereby providing a passage way for a test unit generally indicated by the reference character 48.

The test unit comprises a knob or grip member 49 composed of aluminum or the like having a reduced tubular extension 51 formed thereon from which extends a radial arm 52 adapted to engage and move the resilient member 27 into operative engagement with the contact actuating member 28 provided on the microswitch 24.

A locking element generally indicated by the reference character 53 and composed of steel or the like is secured to the tubular member 51 of the knob 49 by a pair of screws 54. The locking element comprises an enlarged head 55 adapted to seat within the bore 46 provided in the cap 43, the locking element also having a reduced extension 57 integrally formed thereon adapted to engage the reduced portion 58 of the bore 46 thus providing a bearing surface for the test unit when the test unit has been inserted into the barrel. The reduced extension is also provided with a pair of diametrically and oppositely spaced lugs 61, the purpose of which will be more clearly apparent as the description proceeds.

The testing unit comprises an elongated body portion 62 having a circular portion 63 provided at one end thereof, and integrally connected thereto is a tubular extension 64 adapted to extend into a bore 65 provided in the reduced extension 57, and secured therein by a pair of diametrically disposed screws 60. The other end of the body portion 62 is provided with a cradle 66 for supporting the detonator 70 in position during testing operation. The cradle comprises a body portion 67 intermediate the ends thereof as at 68 and having a pair of ears 69 and 71 respectively formed on each end thereof thus providing means whereby the detonator 70 may be quickly inserted into the cradle. It will be understood, however, that the cradle is so constructed as to prevent substantial damage thereto should a defective detonator explode therein during testing operation inasmuch as the cradle is open on the sides, ends and top portions. In the event that a cradle should sustain damage as a result of a premature firing of the detonator during testing operation, the defective cradle may be easily replaced by merely loosening the screws 60. The intermediate portion of the body 62 is cut away as indicated at 73 thereby to provide a flat surface 74 upon which is secured a strip of insulation material 75, the strip being secured thereto by a plurality of screws 76 or the like.

The screws 76 also secure a block 77 composed of insulating material such, for example, as Bakelite to the strip 75 and the body portion 62 of the testing unit 48. A pair of contact springs 78 are secured to the block 77 by screws 79, each spring having a tab 81 formed thereon, the purpose of which will be hereinafter more fully described.

As shown on Fig. 3 of the drawing, the cradle 66 extends into an explosive chamber 82 provided within the tube 29 between the reinforcing sleeve 38 and a vent plug generally indicated by the reference character 83. One end of the barrel 29 is reinforced by an annular member 84 secured thereto in any suitable manner and adapted to extend somewhat beyond the end of the tube thereby forming a shoulder 85.

The vent plug 83 comprises a body portion 86 having a screw threaded portion 87 thereon adapted to have threaded engagement with an internally threaded portion 88 provided in one end of the tube 29. The plug also comprises a flange 89 adapted to seat against the shoulder 85 in such a manner as to seal the end of the tube 29 as best shown on Fig. 3 of the drawings. A reduced portion 91 is formed on the body portion 86 of the plug 83 and integrally formed thereon is a deflector head 92. A bore 93 extends a predetermined distance into the vent plug and communicates with a plurality of apertures 94 provided on the portion 91 thus providing means whereby the explosive chamber 82 is vented should a defected detonator explode therein during testing operations.

An electrical cable 95 extends through registering openings 96 provided in the locking member 53 and knob 49, the cable having a pair of conductors 97 enclosed therein, one end of each conductor being soldered to the tabs 81 provided on the spring contacts 78. The cable is securely held within the locking element and prevented from being forcibly withdrawn therefrom by a packing ring 98 secured to the cable and adapted to seat in a recess 99 provided in the locking element. The other end of each conductor 97 has secured thereto a phone tip 101 or the like, each phone tip being adapted to have locking engagement with a spring actuated terminal 102 insulated from the base 10 by a strip of Bakelite or the like 103 and insulating sleeve 104. Secured to the base 10 is a pair of test terminals 105 insulated therefrom by the strip 103 and sleeves 106 thereby providing means whereby a test set of any well known type may be electrically connected thereto. A test circuit is thus provided to the detonator 70.

As shown on Figs. 3, 6, 7, and 8 of the drawings, the detonator to be tested is arranged within the cradle 66 and each lead 107 thereof passes between the ears 71 and extends a predetermined distance therebeyond, the leads being separated in such a manner as to pass around opposite sides of the block 77 and engage their respective contact springs 78, the leads 107 being maintained in engagement with the contact springs 78 by a slider generally indicated by the reference character 108. The block 77 is tapered and the portion 80 thereof is formed in such a manner as to provide a guide for guiding the detonator leads into engagement with each contact spring 78 as the detonator is inserted into the cradle 66.

The slider 108 comprises a sleeve 109 of metal or any other material suitable for the purpose, adapted to engage the portion 62 of the testing unit 48 and to have sliding movement thereon for the purpose of clamping and releasing the leads 107 when desired. The slider 108 also comprises an inverted U-shaped block 110 composed of any suitable material such, for example, as hard rubber or Bakelite, being secured to the tube or sleeve 109 by rivets 111 or the like, and the flat portions 112 thereof engaging the insulating strip 75 secured to the flat surface 74 of the testing unit 48 in such a manner as to permit free sliding movement of the sleeve along the portion 62 and also insulating the sleeve from the test unit 48.

A pair of copper plates 113 are arranged on opposite sides of a cut out portion 114 provided in the block 110 and are secured thereto in any suitable manner but preferably by having each end portion of each plate 113 bent in such a manner as to form a bevel portion 115 and a straight portion 116, the straight portion 116 being in engagement with slots 117 provided in each end of the block 110. It will be understood, however, that the copper plates 113 are adapted to engage the leads 107 of the detonator 72 and clamp the leads between the plates and the spring contacts 78 when the sleeve is moved into the position shown on Figs. 3, 6, 7, and 14 of the drawings, thereby to establish an electrical connection to the detonator 72.

A pin 118 is secured to the portion 62 of the testing unit and extends a predetermined distance below the curved surface thereof and is adapted to engage and stop the sleeve 109 when the sleeve has moved a predetermined distance along the portion 62, thus assuring quick and positive clamping of the leads 107 to the spring contact 78 by the plates 113 arranged within the sleeve.

As shown on Fig. 3 of the drawings the testing unit including the detonator holder 48 has been inserted into the barrel 29 and rotated to the locked or test position therein. The lugs 61 now engage the inner surface 119 of the plug 43 and are maintained in contact therewith by a pair of arcuately shaped springs 121 secured to the head 55 of the locking element 53 by screws 100. The springs 121 are adapted to engage a shoulder 122 provided within the cap 43 and thus in response to the outward pressure exerted on the testing unit by the springs 121 the lugs are maintained in frictional engagement with the surface 119 thereby maintaining the test unit 48 in test position within the barrel 29.

It will be understood, however, that when the test unit 48 is in the position as shown on Fig. 3 of the drawings, the arm 52 formed on the member 51 extends through a slot 123 provided in the wall 11 and engages the resilient member 27 and forces the spring into engagement with the contact actuating element 28 of the microswitch 24 whereby a short circuit is removed from the detonator and an electrical impulse is adapted to be supplied to the detonator 70 being tested from a suitable source of power. It will be further understood that when the test unit 48 is inserted into the barrel 29 the unit is held in a position at a right angle to that shown on Fig. 3 of the drawings so that the lugs 61 may readily pass through the recesses 47 in the cap 43 and enter the chamber 45 provided therefor. When this has been done the unit 48 is rotated in a clockwise direction and the lugs 61 are rotated within the chamber 45 until one of the lugs engages a stop 124 formed on the rear surface of the cap 43 thereby preventing further rotation of the unit within the barrel 29. The test unit is now in a test position within the barrel.

Fig. 16 illustrates in diagrammatical form an electrical circuit suitable for use with the testing device, the circuit including the microswitch 24 having a movable contact 125 normally in engagement with a stationary contact 126, in which position the detonator 70 is short-circuited. It will be understood, however, that when the unit 48 is rotated into locked position, the arm 52 will engage the resilient member 27 as heretofore described, thereby actuating the member 28 and forcing the movable contact 125 away from the contact 126 and into engagement with the stationary contact 127 thus removing the short circuit from the detonator and connecting the detonator 70 in series with a suitable test set. The test set may be of any suitable type but for the purposes herein comprises a battery 128, a meter 129, connected in parallel with the battery, a switch 131 being connected therebetween in order that the meter may be adjusted to the zero position thereof by varying a rheostat 132. Another switch 133 is provided between the meter and the detonator thereby to prevent current from flowing to the detonator, when the meter is being adjusted to zero. After the meter has been adjusted to the zero position, switch 131 is maintained in the closed position and switch 133 is closed, thereby completing a circuit from battery 128 to the detonator 70 through the microswitch when the movable contact 125 thereof is in engagement with contact 127 thereof.

In accordance with the circuit arrangement shown in Fig. 16, the detonator 70 is employed as an unknown shunt resistance and the current flowing through the meter 129 gives an indication of the resistance of the detonator under test. It will be apparent from the foregoing description that the testing device is constructed in such a manner as to be safe at all times during testing operations inasmuch as the detonator is normally short-circuited prior to the testing thereof and is not connected in series with the test set until the unit 48 has been inserted into the tube or barrel 29 and the test unit has been rotated to a locked position. The push button switches 131 and 133 of the test set are now moved to the closed position. Should the detonator be defective the ohmmeter will indicate the defect and should the detonator explode as a test current of only a small fractional part of the current normally required to operate the detonator is applied thereto, the explosion will occur within the barrel 29 thereby preventing injury to the operator, as the barrel is so constructed as to withstand the force of the explosion.

The many advantages of the detonator testing device constructed in accordance with the present invention will be readily apparent from the foregoing description and, although a preferred embodiment of the device is illustrated and described, it is to be understood that changes in the details of construction and in the combination and arrangement of parts may be resorted to which fall within the scope of the invention as claimed.

The invention described herein may be manufactured and used by or for the Government of the United States of America for governmental purposes without the payment of any royalties thereon or therefor.

What is claimed as new and desired to be secured by Letters Patent of the United States is:

1. A device for testing an electroresponsive detonator and connecting an external electrical test circuit thereto comprising a base member, a reinforced test barrel supported on said base member, a removable test unit rotatable within said barrel, means on said test unit for rotating the unit from an initial safe position to a test position, a pair of spring contact elements secured to said test unit, means including an annular member slideably arranged on said test unit for detachably clamping said detonator to the unit and electrically connecting the contact elements and detonator together as the annular member is moved a predetermined amount on the unit, means including a pair of lugs arranged on said test unit and in engagement with said barrel for locking the unit in said test position, a switch secured to said base member and operatively connected to said contact elements and to said test circuit for closing the test circuit to said detonator as the switch is actuated, and an arm on the test unit for actuating said switch as the test unit is rotated from said safe position and locked in said test position.

2. A device for testing an electroresponsive detonator and connecting an external electrical test circuit thereto comprising a base member, a reinforced barrel supported on said base member and having an explosive chamber therein, means connected to one end of said barrel for providing said explosive chamber therein, said last named means having a plurality of apertures therein for venting said explosive chamber, a removable test unit rotatable within said barrel, means on said test unit for rotating the unit from an initial safe position to a test position, means including an annular member slideably arranged on said test unit for detachably supporting said detonator thereon and within the explosive chamber, means including a pair of lugs arranged on the test unit and in engagement with the barrel for locking the unit in said test position, a pair of resilient members secured to the test unit and in engagement with the barrel for maintaining the unit locked in said test position, a pair of spring contact elements secured to the test unit and electrically connected to the detonator leads by said annular member, said annular member being slideable to a position for clamping the contact elements and detonator leads together, a switch secured to the base member and operatively connected to said contact elements and to said test circuit for closing the test circuit to the detonator as the switch is actuated, and an arm secured to the test unit for actuating said switch as the test unit is rotated from said safe position and locked in said test position.

3. In a device of the class disclosed for testing an electroresponsive detonator and connecting an external electrical test circuit thereto, in combination, a base member, a reinforced barrel supported by said base member, a removable test unit rotatably supported within said barrel, means on said test unit for rotating the test unit from an initial safe position to a test position, a pair of lugs on said test unit in engagement with said barrel for locking the unit in said test position, a pair of spring members on the unit in engagement with the barrel for maintaining the unit locked in said test position, a cradle secured to the unit and extending a predetermined amount into said barrel for supporting said detonator therein, a pair of spring contact elements secured to the unit and connected to said circuit, an annular member slideably arranged on said unit for operatively connecting the detonator to said contact elements, a normally open switch connected to the test circuit and operatively connected to said spring contact elements for interrupting the circuit between the contact members and the test circuit when the test unit is in said initial safe position, said switch being supported on said base member and constructed and arranged to be actuated to a closed position and connect the detonator to the test circuit, and an arm secured to said unit for actuating said switch to said closed position as the unit is rotated and locked in said test position.

4. In a device of the class disclosed for testing an electroresponsive detonator and connecting an external electrical test circuit thereto, in combination, a base member, a reinforced barrel supported by said base member for enclosing said detonator, a removable test unit arranged within the barrel for rotation to the locked position therein, a pair of lugs on said test unit in engagement with said barrel for locking the test unit within said barrel, a pair of springs secured to the test unit in engagement with said barrel for maintaining the unit locked to the barrel, a cradle secured to the test unit and extending a predetermined amount into said barrel for supporting the detonator within the barrel, a pair of spring contact elements secured to the test unit and electrically connected to the test circuit, an annular member slideably arranged on the test unit, a pair of diametrically arranged plates on said annular member for detachably securing the detonator leads to said spring contact elements and electrically connecting the detonator within said test circuit, a normally open switch supported on said base member and operatively connected to said contact elements and to said circuit for closing the circuit to the detonator when the switch is actuated to a closed position, and means secured to the test unit for actuating said switch to said closed position as the unit is rotated to said locked position.

RONALD O. BEACH.

REFERENCES CITED

The following references are of record in the file of this patent:

UNITED STATES PATENTS

| Number | Name | Date |
|---|---|---|
| 956,877 | Beattie | May 3, 1910 |
| 1,869,646 | Anderson | Aug. 2, 1932 |
| 2,163,475 | Tomalis | June 20, 1939 |
| 2,208,558 | Appleton | July 23, 1940 |
| 2,492,459 | Bondurant | Dec. 27, 1949 |